United States Patent
Tagawa

(10) Patent No.: US 6,479,809 B2
(45) Date of Patent: Nov. 12, 2002

(54) RADIAL TILT DETECTOR MEASURING AN ACCELERATION AND DISTANCE OF A BEAM SPOT

(75) Inventor: Yukihiro Tagawa, Yokohama (JP)

(73) Assignee: Samsung Electro-Mechanics Co., Ltd., Kyunggi-do (KR)

(*) Notice: Subject to any disclaimer, the term of this patent is extended or adjusted under 35 U.S.C. 154(b) by 20 days.

(21) Appl. No.: 09/821,737

(22) Filed: Mar. 30, 2001

(65) Prior Publication Data

US 2002/0053646 A1 May 9, 2002

(30) Foreign Application Priority Data

Sep. 1, 2000 (JP) .......................... 2000-266253

(51) Int. Cl.[7] .................. G02B 27/40; G02B 27/64; G11B 7/00; G11B 5/09; G11B 11/03
(52) U.S. Cl. ................. 250/201.5; 369/44.32; 369/44.41; 369/53.18
(58) Field of Search .................. 250/201.5; 369/53.12, 369/53.19, 44.32, 53.18, 53.23, 53.28, 53.42, 44.41

(56) References Cited

U.S. PATENT DOCUMENTS 5,886,966 A * 3/1999 Ota et al. ................ 369/53.18
6,259,665 B1 * 7/2001 Nagasato ................. 369/44.32

* cited by examiner

*Primary Examiner*—Georgia Epps
*Assistant Examiner*—Alicia M. Harrington
(74) *Attorney, Agent, or Firm*—Morgan, Lewis & Bockius LLP

(57) ABSTRACT

A radial tilt detector provided in an optical disc recording/reproduction apparatus includes an optical head for projecting a condensed beam of light on a recording surface of an optical disc and receiving a projected beam of light reflected from the recording surface, a focus actuator for focusing the condensed beam and a driver for outputting a drive signal to drive the focus actuator. The detector also includes an acceleration detector for outputting a signal indicative of an acceleration in a direction depending on an optical axis of the light beam, and a radial tilt calculation processor for receiving the acceleration signal and a signal indicative of the distance between the center of the optical disc and the projected position of the light beam on the recording surface where calculating the radial tilt is based on the received signals and the rotation velocity of the optical disc.

7 Claims, 4 Drawing Sheets

| $\omega t$ | $Z$ (displacement) | $\dot{Z}$ (velocity) | $\ddot{Z}$ (acceleration) |
|---|---|---|---|
| 0 | 0 | + | 0 |
| $\pi/4$ | + | + | − |
| $\pi/2$ | + | 0 | − |
| $3\pi/4$ | + | − | − |
| $\pi$ | 0 | − | 0 |
| $5\pi/4$ | − | − | + |
| $3\pi/2$ | − | 0 | + |
| $7\pi/4$ | − | + | + |

| ωt | Z (displacement) | Ż (velocity) | Z̈ (acceleration) |
|---|---|---|---|
| 0 | 0 | + | 0 |
| π/4 | + | + | − |
| π/2 | + | 0 | − |
| 3π/4 | + | − | − |
| π | 0 | − | 0 |
| 5π/4 | − | − | + |
| 3π/2 | − | 0 | + |
| 7π/4 | − | + | + |

(a)  (b)  (c)

RADIAL TILT DETECTOR MEASURING AN ACCELERATION AND DISTANCE OF A BEAM SPOT

BACKGROUND OF THE INVENTION

1. Field of the Invention

The present invention relates in general to tilt detectors for optical head tilt servo devices in optical disc players and the like, and more particularly to a radial tilt detector for detecting a tilt in a radial direction of an optical disc.

2. Description of the Prior Art

An optical disc apparatus is generally adapted to project a small and narrow beam of light on an optical disc through an object lens to scan a fine mark (recording mark) on the disc so as to reproduce information recorded thereon. At this time, the surface of the optical disc may be tilted relative to a beam of light from an optical head due to a distortion of the disc, a surface vibration, etc. In this case, the beam of light from the optical head is incident on the surface of the optical disc to reproduce information recorded thereon, while being tilted relative to the disc surface, thereby making it difficult to accurately read the recorded information.

FIG. 7 shows variations in tilt of a spot of light formed on the surface of an optical disc by a beam of light, relative to the disc surface. In particular, the lower part of FIG. 7 shows the shapes of the light spot and the upper part thereof shows light intensity distributions of the spot.

In more detail, FIG. 7b shows the shape and intensity distribution of the light spot when the light beam is perpendicular to the disc surface. In this drawing, the light spot is shown to have a symmetrical shape. FIGS. 7a and 7c show the shapes and intensity distributions of the light spot when the disc surface is tilted relative to the light beam. In each of these drawings, a coma-aberration is generated in the light spot on the disc, and the light spot has an asymmetrical shape.

For the purpose of preventing the above coma-aberratior, the optical disc apparatus comprises a tilt servo device for correcting a tilt of an optical axis of the optical head to maintain the optical axis perpendicular to the disc surface. The tilt servo device includes tilt detection means for detecting the amount of a tilt of a beam of light projected from the optical head relative to the disc surface.

A tilt sensor is generally used to detect a tilt amount. This tilt sensor is conventionally installed in the tilt detection means separately from an optical system which generates a beam of light for reproduction of information recorded on the optical disc. In this construction, the tilt sensor must be spaced apart from the object lens of the optical head at a certain distance in order to avoid an interference therebetween. However, the tilt sensor and the object lens of the optical head must become closer to each other to obtain a more approximate value to a tilt amount of a projected position of a light spot on the disc surface relative to the surface.

FIG. 8 is a perspective view showing an example of the construction of a head part in a conventional optical disc apparatus. A head part 102 is positioned under an optical disc 101, and an object lens 103 of an optical head and a tilt sensor 104 of tilt detection means are arranged on the upper surface of the head part 102. The tilt sensor 104 is arranged on the upper surface of the head part 102 in such a manner that a spot of light 106 formed by a beam of light 105 emitted from the object lens 103 passes therethrough and is substantially aligned therewith on a track 107 of the disc surface. Through this arrangement, the tilt sensor can approximately detect the position of the light spot 106 and the tilt amount of the disc surface.

However, in the head part with the above-mentioned construction, because the light spot and the tilt sensor are not perfectly aligned with each other, it is inevitable that a value detected by the tilt sensor is in error. This cannot guarantee a sufficient degree of precision, for example, when a high degree of tilt correction is required according to a recording densification of the disc.

Further, because the optical head and tilt detection means are provided separately, the number of components increases, resulting in an increase in cost and a complexity in the construction of the head part.

SUMMARY OF THE INVENTION

Therefore, the present invention has been made in view of the above problems, and it is an object of the present invention to provide a radial tilt detector which is capable of detecting a tilt in a radial direction of an optical disc at a high degree of precision and being cost-effective and simple in head part construction.

In accordance with one aspect of the present invention, the above and other objects can be accomplished by the provision of a radial tilt detector adapted to, by measuring an acceleration of a spot position on a recording surface of an optical disc at which a beam of light is condensed, in a focusing direction of the optical disc, a velocity of the spot position in a rotation direction of the optical disc and a distance from the center of the optical disc to the spot position, calculate an angle defined by three vectors, or an acceleration vector in the focusing direction of the optical disc, an acceleration vector toward the center of the optical disc and perpendicular to the acceleration vector in the focusing direction of the optical disc and a resultant vector of the acceleration vector in the focusing direction of the optical disc and the acceleration vector toward the center of the optical disc and detect a radial tilt angle on the basis of the calculated angle, the radial tilt angle being a tilt angle in a radial direction of the optical disc.

In accordance with another aspect of the present invention, there is provided a radial tilt detector for an optical disc information recording/reproduction apparatus which includes an optical head for projecting a condensed beam of light on a recording surface of a rotating optical disc and receiving the projected beam of light reflected from the recording surface of the optical disc, a focus actuator for focusing the condensed beam of light on its project ed position of the recording surface of the optical disc, and drive means for outputting a drive signal to drive the focus actuator, the radial tilt detector being adapted to detect a radial tilt which is a tilt amount in a radial direction of the recording surface of the optical disc and comprising acceleration detection means responsive to the drive signal from the drive means for outputting a signal indicative of an acceleration in a direction depending on an optical axis of the light beam at the position focused by the focus actuator; and radial tilt calculation processing means for receiving the acceleration signal from the acceleration detection means and a signal indicative of a distance between the center of the optical disc and the projected position of the light beam on the recording surface of the optical disc and calculating the radial tilt using the received signals and a rotation velocity of the optical disc or a linear velocity at which the light beam scans the recording surface of the optical disc.

Preferably, the acceleration detection means may include an observer.

Preferably, radial tilt calculation processing means may include first division means for dividing the square of the linear velocity by the distance between the center of the optical disc and the protected position of the light beam on the recording surface of the optical disc and outputting the divided result; second division means for dividing the acceleration indicated by the acceleration signal from the acceleration detection means by the output of the first division means and outputting the divided result; and arctangent calculation means for taking an arctangent of the output of the second division means and outputting the resulting value as the radial tilt.

Alternatively, the radial tilt calculation processing means may include multiplication means instead of the first division means, the multiplication means multiplying the square of the rotation velocity of the optical disc by the distance between the center of the optical disc and the projected position of the light beam on the recording surface of the optical disc and outputting the multiplied result.

As an alternative, the radial tilt calculation processing means may include coefficient multiplication means instead of the arctangent calculation means, the coefficient multiplication means multiplying the output of the second division means by a certain coefficient and obtaining the radial tilt as a result of the multiplication.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

First, the principle of the present invention will be described. The tilt of an optical disc is generally classified into a radial tilt, or a tilt in a radial direction of the disc, and a tangential tilt, or a tilt in a tangential direction of a track of the disc. A description will hereinafter be given of the radial tilt.

The radial tilt includes a planar component and an inverted U-shaped (or inverted V-shaped) component. The planar component nay be a concentric spherical component and other radial component resulting from a surface vibration. Namely, the planar component may be, for example, a radial tilt component resulting from a surface vibration due to a disc deformation or an error in a disc information recording/reproduction apparatus, or from a planar disc deformation. The inverted U-shaped or V-shaped component may result from a concentric disc distortion about the rotation axis of the disc. That is, this inverted U-shaped or V-shaped component is generated on the basis of only a disc distortion.

This invention relates to a device for detecting the planar component of the radial tilt among the above components. In an apparatus for recording and reproducing information on/from an optical disc, actually, the optical disc rotates, a spot of light, which is emitted from an optical pickup and condensed by a lens, is projected on a track of the rotating disc, and the projected light spot scans the track of the rotating disc. In other words, the spot of light does not move even though the surface of the optical disc moves. But, for brevity of description, it is hereinafter assumed that the spot of light rotates on the optical disc while it is stopped. The reason is that, in either case, a relative position of the light spot to the surface of the optical disc varies. Provided that the spot of light rotates on the surface of the optical disc while it is stopped, the acceleration thereof will be generated in a direction depending on the disc surface.

At this time, assuming that the surface of the optical disc is tilted relative to a beam of light from the optical pickup, a spot of light formed by the light beam rotates along the tilted surface. This is similarly applied even though the surface of the optical disc has a mosaic shape composed of a number of micro-planes, as if it is covered with a number of randomly tilted tiles.

Figure 1:
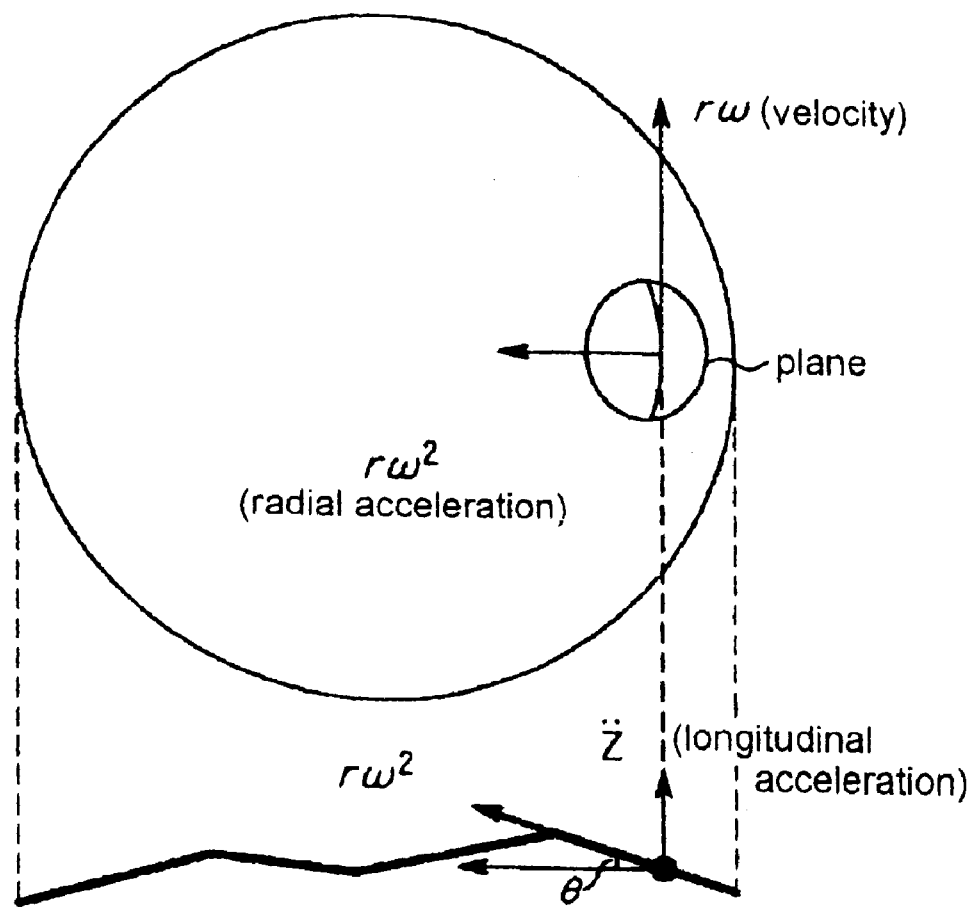
FIG. 1 is a view illustrating the acceleration and velocity of a spot of light on the surface of an optical disc with micro-planes.

FIG. 1 is a view illustrating the acceleration and velocity of a spot of light on the surface of an optical disc with micro-planes. Provided that a spot of light is projected on a micro-plane having a radial tilt, its radial acceleration depends on the micro-plane. Further, a rotation velocity of the light spot depends on the micro-plane, too.

Figure 2:
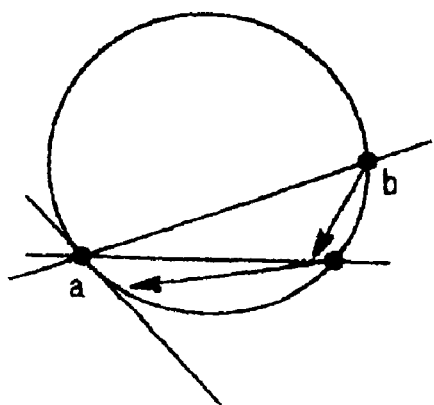
FIG. 2 is a view illustrating the direction of the velocity of the light spot depending on the rotation of the spot.

The above phenomenon will hereinafter be described in detail with reference to FIG. 2. When a dot-shaped spot describes a circular arc, the direction of a velocity vector thereof is the same as a tangential direction of the circular arc and the velocity vector is present on a plane including the arc. A tangent line at a point a can be expressed by the following equation 1:

$$l(a) = \lim_{b \to a} l(a, b) \quad \text{[Equation 1]}$$

Also, an acceleration vector of the above dot-shaped spot can be derived from the below equation 2:

$$a(t) = \lim_{\Delta t \to 0} \frac{v(t+\Delta t) - v(t)}{\Delta t} = \lim_{\Delta t \to 0} \frac{\Delta v}{\Delta t} \quad \text{[Equation 2]}$$

where, a(t): acceleration of dot at time t, v(t+Δt) velocity vector of dot at time (t+Δt), and v(t): velocity vector of dot at time t.

The acceleration of the spot on the micro-plane can be considered under the condition that it is decomposed into an acceleration $r\omega^2$ (r is a distance between the center of the disc and the spot and ω is an angular velocity of the spot) in a direction depending on the micro-plane and an acceleration $d^2Z/dt^2$ (quadratic differentiation of a displacement Z toward the axis of the disc, toward the axis of the disc. The acceleration $r\omega^2$ in the direction depending on the micro-plane can be considered to be substantially the same as an acceleration in a direction depending on an orthogonal plane to the axis of the optical disc (referred to hereinafter as a reference plane) if the angle of the micro-plane relative to the reference plane is small. In other words, an acceleration vector on the micro-plane can be expressed as a resultant vector of an acceleration vector on the reference plane (the magnitude of this vector approximates $r\omega^2$) and an acceleration vector toward the axis of the disc (the magnitude of this vector is $d^2Z/dt^2$).

Accordingly, a tilt angle of the micro-plane relative to the reference plane in the radial direction of the disc, including the above resultant vector, namely, a radial tilt angle θ of the micro-plane relative to the reference plane satisfies the following equation 3:

$$\tan\theta = \frac{\left(\frac{d^2Z}{dt^2}\right)}{r\omega^2} \quad \text{[Equation 3]}$$

Therefore, the radial tilt angle θ can be obtained from the following equation 4:

$$\theta = \frac{\tan^{-1}\left(\frac{d^2Z}{dt^2}\right)}{r\omega^2} \quad \text{[Equation 4]}$$

In the case where the disc rotates in a constant linear velocity (CLV) node, the spot can be considered to rotate in the CLV mode. As a result, because $r\omega^2=(r\omega)^2/r$ under the condition that $r\omega$ is constant, the radial tilt angle θ can be obtained from r and $d^2Z/dt^2$. In the case where the disc rotates in a constant angular velocity (CAV) mode, the spot can be considered to rotate in the CAV mode, too. As a result, the radial tilt angle θ can be obtained from r and $d^2Z/dt^2$ because ω is constant.

Assuming that the radial tilt angle is θ, the displacement Z, velocity $dZ/dt$ and acceleration $d^2Z/dt^2$ of the light spot toward the axis of the disc can be expressed by the below equations 5 through 7:

$$Z=(r\times\sin\omega t)\tan\theta=(r\times\tan\theta)\sin\omega t \quad \text{[Equation 5]}$$

$$\frac{dZ}{dt} = (r\omega \times \tan\theta)\cos\omega t \quad \text{[Equation 6]}$$

$$\frac{d^2Z}{dt^2} = -(r\omega^2\tan\theta)\sin\omega t \quad \text{[Equation 7]}$$

Figures 3, 4:
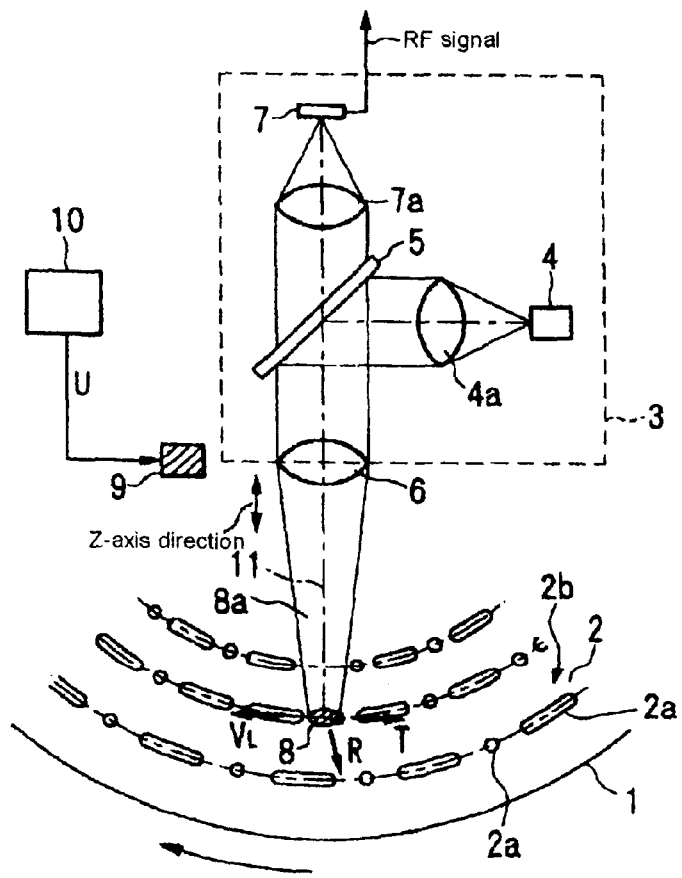
FIG. 3 is a table showing signs of the displacement Z, velocity dZ/dt and acceleration $d^2Z/dt^2$ of the light spot.
FIG. 4 is a view showing the overall construction of an apparatus for recording and reproducing information on/from an optical disc, to which this invention is applied.

Signs of the displacement Z, velocity $dZ/dt$ and acceleration $d^2Z/dt^2$ are shown in FIG. 3.

FIG. 4 is a view showing the overall construction of an apparatus for recording and reproducing information on/from an optical disc, to which this invention is applied. A recording mark 2a is formed on a track 2 of an optical disc 1 on which information to be reproduced is recorded. A head 3 for reproducing the recorded information is arranged at a position facing a surface on which the recording mark 2a is formed.

The head 3 is movable in a radial direction R of the optical disc 1 by moving means, not shown. A spot of light 8 is projected on the track 2 of the optical disc 1 by a beam of light 8a emitted from the head 3. The moving means moves a radial position of the light spot 8 with rotation of the optical disc 1, thereby enabling the spot 8 to scan the track 2.

The head 3 includes a laser diode 4 for emitting a beam of laser light, a collimating lens 4a for transforming the beam of laser light emitted from the laser diode 4 into a collimated beam of light, a beam splitter 5, an object lens 6 for receiving the collimated beam of light from the collimating lens 4a through the beam splitter 5, condensing on a recording surface 2b of the optical disc 1 on which the recording mark 2a is formed and collimating a beam of light reflected from the recording surface 2b, a collimating lens 7a for condensing the reflected beam of light collimated by the object lens 6, and a sensor 7 for receiving the reflected bean of light condensed by the collimating lens 7a.

The laser diode 4 emits a beam of laser light, which is then collimated by the collimating lens 4a, reflected by the beam splitter 5 and condensed by the object lens 6, resulting in the formation of a beam of light 8a. Then, a spot of light 8 is projected on the track 2 of the optical disc 1 by the light beam 8a. This light beam is then intensity-modulated and reflected by the recording mark 2a on the track 2 to the beam splitter 5 via the object lens 6. Thereafter, the reflected beam of light is transmitted to the collimating lens 7a through the beam splitter 5, condensed by the collimating lens 7a and then received by the sensor 7. The sensor outputs a radio frequency (RF) signal corresponding to the received light beam, or the light beam intensity-modulated by the recording mark 2a.

The object lens 6 in the head 3 is driven in a parallel direction with an optical axis 11 of the light beam 8a, namely, in a Z-axis direction by a focus actuator 9, thereby causing the light spot 8 to be focused on the track 2. A driver 10 is provided to drive the focus actuator 9.

Next, a description will be given of an embodiment of a radial tilt detector in accordance with the present invention with reference to FIG. 5. The driver 10 outputs a drive signal U (drive current or drive voltage) to the focus actuator 9, which then outputs a positioning signal Y in response to the drive signal U.

The drive signal U and positioning signal Y are applied to an observer 11, which includes a focus actuator model 12 and subtracter 13. The drive signal U is applied to the focus actuator model 12 and the positioning signal Y is applied to the subtracter 13, which also receives an output signal 12a from the focus actuator model 12. The subtracter 13 subtracts the output signal 12a from the focus actuator model 12 from the positioning signal Y and feeds the subtracted result back to the focus actuator model 12.

The focus actuator model 12 outputs a positioning signal Z indicative of the Z-axial driving of the object lens 6 and an acceleration signal $d^2Z/dt^2$. These signals represent the position and acceleration of the object lens 6 in the Z-axis direction, respectively. Further, the positioning signal Z and acceleration signal $d^2Z/dt^2$ represent the position and acceleration of a point on the recording surface 2b of the optical disc 1 at which the beam of light 8a from the object lens 6 is emitted and condensed, respectively.

The condensed point of the light beam 8a is controlled such that it is always positioned on the recording surface 2b of the optical disc 1. This control operation is performed by control means, not shown, which controls the driver 10 to vary the level of the drive signal U. As a result, the condensed point of the light beam 8a is always the same as a contact point of the light beam 8a and the recording surface 2b of the optical disc 1.

The acceleration signal $d^2Z/dt^2$ from the focus actuator model 12 is applied to a radial tilt calculation processor 15, which also receives a signal indicative of a distance r between the center of the optical disc and the light spot, provided from specific means, not shown. The radial tilt calculation processor 15 outputs a signal indicative of a radial tilt in response to the received signals.

Figure 5:
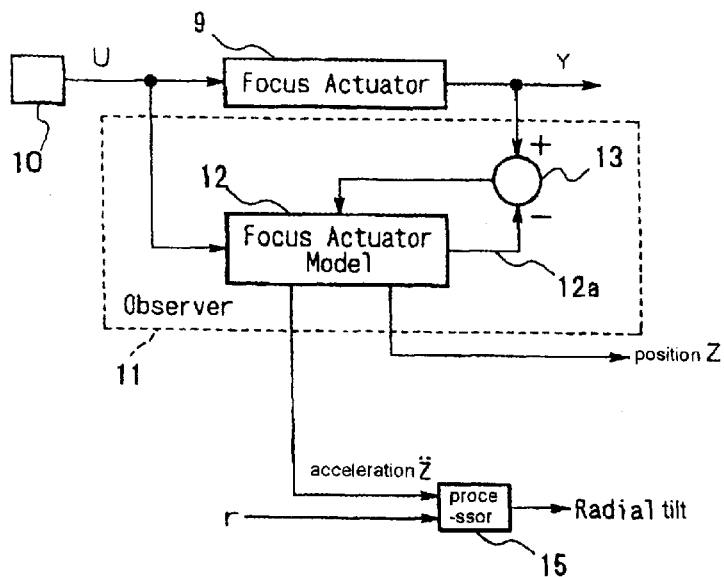
FIG. 5 is a block diagram showing an embodiment of a radial tilt detector in accordance with the present invention.
Figure 6A:
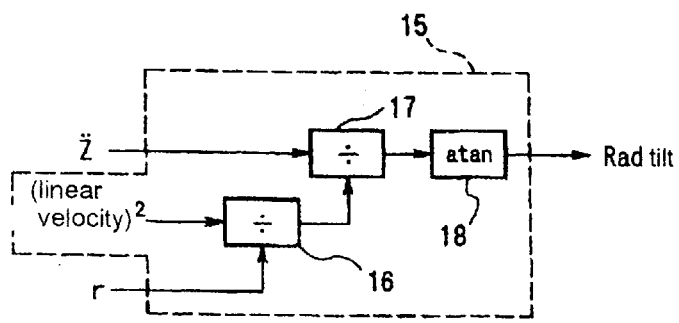
FIGS. 6a and 6b are detailed block diagrams showing different embodiments of a radial tilt calculation processor in FIG. 5.
Figure 6B:
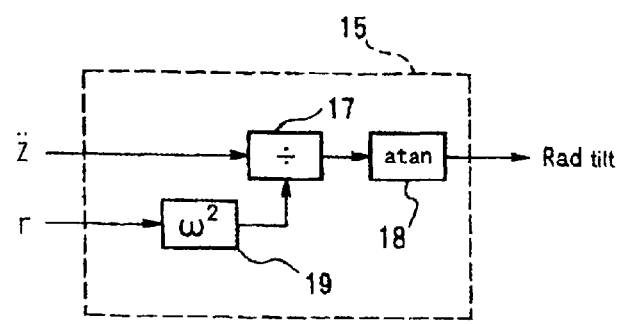
Figure 7:
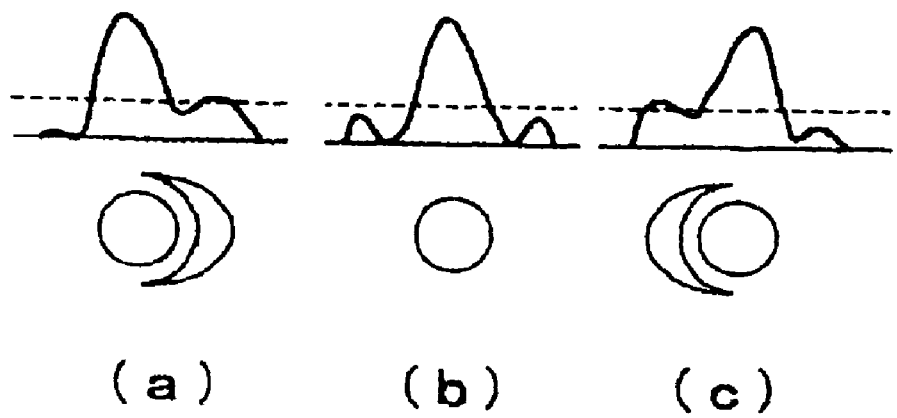
FIGS. 7a to 7c are views showing variations in tilt of a spot of light formed on the surface of an optical disc by a beam of light, relative to the disc surface.
Figure 8:
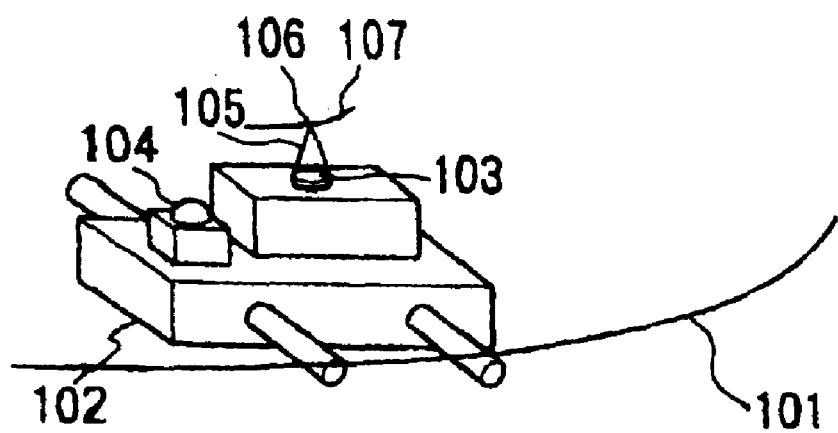
FIG. 8 is a perspective view showing an example of the construction of a head part in a conventional optical disc apparatus.

FIG. 6 shows different embodiments of the radial tilt calculation processor 15 in FIG. 5, wherein FIG. 6a is a detailed block diagram of the radial tilt calculation processor 15 when the optical disc rotates in the constant linear velocity (CLV) mode and FIG. 6b is a detailed block diagram of the radial tilt calculation processor 15 when the optical disc rotates in the constant angular velocity (CAV) mode.

First, the construction and operation of the radial tilt calculation processor 13 in the CLV mode will be described with reference to FIG. 6a. In this CLV node, the radial tilt calculation processor 15 includes a first divider 16, second divider 17 and arctangent calculator 18. The first divider 16 receives the signal indicative of the distance r between the center of the optical disc and the light spot and a signal indicative of the square of a constant linear velocity $r\omega$ for the CLV mode, divides $(r\omega)^2$ by r and outputs the resulting value $r\omega^2$, namely, $(r\omega)^2/r=r\omega^2$. The second divider 17 receives the output $r\omega^2$ of the first divider 16 and the acceleration signal $d^2Z/dt^2$ from the focus actuator model 12, divides $d^2Z/dt^2$ by $r\omega^2$ and outputs the resulting value $(d^2Z/dt^2)/(r\omega^2)$. The arctangent calculator 18 receives the output $(d^2Z/dt^2)/(r\omega^2)$ of the second divider 17, takes an arctangent thereof, namely, $\tan^{-1}\{(d^2Z/dt^2)/(r\omega^2)\}$ and outputs the resulting value as a radial tilt angle $\theta$.

Next, the construction and operation of the radial tilt calculation processor 15 in the CAV mode will be described with reference to FIG. 6b. In this CAV mode, the radial tilt calculation processor 15 includes a multiplier 19, the second divider 17 and the arctangent calculator 18. The multiplier 19 receives the signal indicative of the distance r between the center of the optical disc and the light spot and a signal indicative of the square of a constant rotation velocity $\omega$ of the optical disc for the CAV mode, multiplies $\omega^2$ by r and outputs the resulting value $r\omega^2$. The second divider 17 and the arctangent calculator 18 perform the same operations as in the CLV mode.

As an alternative, a coefficient multiplier ray be provided instead of the arctangent calculator 18 in FIGS. 6a and 6b to multiply the output of the second divider 17 by a certain coefficient and obtain the radial tilt angle $\theta$ as a result of the multiplication. The reason is that, for a fine radial tilt angle $\theta$, the arctangent of the output $(d^2Z/dt^2)/(r\omega^2)$ of the second divider 17 is substantially equal to the multiplication of the output $(d^2Z/dt^2)/(r\omega^2)$ of the second divider 17 by a coefficient.

Moreover, although the preferred embodiment of the present invention has been disclosed with respect to the case where the optical disc rotates in the CLV mode and the case where the optical disc rotates in the CAV mode, this invention is similarly applicable to a zone constant linear velocity (ZCLV) mode where the optical disc rotates constantly at a zone-unit linear velocity.

As apparent from the above description, the present invention provides a radial tilt detector which is capable of detecting a tilt in a radial direction of an optical disc at a high degree of precision and being cost-effective and simple in head part construction.

Further, according to this invention, the radial tilt detector is able to detect the radial tilt under the condition that a recording surface of the optical disc is composed of a number of micro-planes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radial tilt detector adapted to, by measuring an acceleration of a spot position on a recording surface of an optical disc at which a beam of light is condensed, in a focusing direction of said optical disc, a velocity of said spot position in a rotation direction of said optical disc and a distance from the center of said optical disc to said spot position, calculate an angle defined by three vectors, or an acceleration vector in said focusing direction of said optical disc, an acceleration vector toward said center of said optical disc and perpendicular to said acceleration vector in said focusing direction of said optical disc and a resultant vector of said acceleration vector in said focusing direction of said optical disc and said acceleration vector toward said center of said optical disc and detect a radial tilt angle on the basis of the calculated angle, said radial tilt angle being a tilt angle in a radial direction of said optical disc.

2. A radial tilt detector for an optical disc information recording/reproduction apparatus which includes an optical head for projecting a condensed beam of light on a recording surface of a rotating optical disc and receiving the projected beam of light reflected from said recording surface of said optical disc, a focus actuator for focusing said condensed beam of light on its projected position of said recording surface of said optical disc, and drive means for outputting a drive signal to drive said focus actuator, said radial tilt detector being adapted to detect a radial tilt which is a tilt amount in a radial direction of said recording surface of said optical disc and comprising:

acceleration detection means responsive to said drive signal from said drive means for outputting a signal indicative of an acceleration in a direction depending on an optical axis of said light beam at said position focused by said focus actuator; and radial tilt calculation processing means for receiving said acceleration signal from said acceleration detection means and a signal indicative of a distance between the center of said optical disc and said projected position of said light bean on said recording surface of said optical disc and calculating said radial tilt using the received signals and a rotation velocity of said optical disc or a linear velocity at which said light beam scans said recording surface of said optical disc.

3. The radial tilt detector as set forth in claim 2, wherein said acceleration detection means includes an observer.

4. The radial tilt detector as set forth in claim 2, wherein said radial tilt calculation processing means includes:

first division means for dividing the square of said linear velocity by said distance between said center of said optical disc and said projected position of said light beam on said recording surface of said optical disc and outputting the divided result;

second division means for dividing said acceleration indicated by said acceleration signal from said acceleration detection means by the output of said first division means and outputting the divided result; and arctangent calculation means for taking an arctangent of the output of said second division means and outputting the resulting value as said radial tilt.

5. The radial tilt detector as set forth in claim 4, wherein said radial tilt calculation processing means includes multiplication means instead of said first division means, said multiplication means multiplying the square of said rotation velocity of said optical disc by said distance between said center of said optical disc and said projected position of said light beam on said recording surface of said optical disc and outputting the multiplied result.

6. The radial tilt detector as set forth in claim 4, wherein said radial tilt calculation processing means includes coefficient multiplication means instead of said arctangent calculation means, said coefficient multiplication means multiplying said output of said second division means by a certain coefficient and obtaining said radial tilt as a result of the multiplication.

7. The radial tilt detector as set forth in claim 5, wherein said radial tilt calculation processing means includes coefficient multiplication means instead of said arctangent calculation means, said coefficient multiplication means multiplying said output of said second division means by a certain coefficient and obtaining said radial tilt as a result of the multiplication.

* * * * *